United States Patent
Eum et al.

(10) Patent No.: US 6,928,045 B2
(45) Date of Patent: Aug. 9, 2005

(54) DISC CLAMPING APPARATUS

(75) Inventors: Jae-yong Eum, Gyeonggi-do (KR); Sun-mo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 513 days.

(21) Appl. No.: 10/232,724

(22) Filed: Sep. 3, 2002

(65) Prior Publication Data

US 2003/0123377 A1 Jul. 3, 2003

(30) Foreign Application Priority Data

Dec. 27, 2001 (KR) ......................................... 2001-85914

(51) Int. Cl.[7] .............................................. G11B 23/00
(52) U.S. Cl. ................................ 369/270.1; 369/271.1; 720/604
(58) Field of Search ........................... 369/270.1, 271.1, 369/264; 720/604, 710; 360/99.05, 99

(56) References Cited

U.S. PATENT DOCUMENTS 4,802,158 A * 1/1989 Ogusu ........................ 720/710
5,610,900 A * 3/1997 Yamashita et al. .......... 720/705
6,570,836 B2 * 5/2003 Yabushita .................... 720/710

* cited by examiner

Primary Examiner—Aristotelis M Psitos
(74) Attorney, Agent, or Firm—Stein, McEwen & Bui, LLP

(57) ABSTRACT

A disc clamping apparatus includes an upper clamper holder, a lower clamper holder which is combined with the upper clamper holder, a clamper which is movably installed between the upper clamper holder and the lower clamper holder and clamps a disc that is disposed on a turntable, a first magnetic member installed between the upper clamper holder and the lower clamper holder, a second magnetic member installed on the turntable to face the first magnetic member so that a magnetic force operates between the first magnetic member and the second magnetic member to clamp the disc and an elastic member disposed between the upper clamper holder and the clamper so as to provide an elastic force to push the clamper against the disc. The disc clamping apparatus clamps discs having various thicknesses. Also, a clamping force of the disc clamping apparatus is changed in proportion to the thickness of the disc, and thus a proper clamping force can be applied to the disc based on the thickness of the disc.

41 Claims, 8 Drawing Sheets

DISC CLAMPING APPARATUS

CROSS-REFERENCE TO RELATED APPLICATIONS

This application claims the benefit of Korean Application No. 2001-85914, filed Dec. 27, 2001, in the Korean Industrial Property Office, the disclosure of which is incorporated herein by reference.

BACKGROUND OF THE INVENTION

1. Field of the Invention

The present invention relates to a disc clamping apparatus clamping a recording/reproducing medium in a disc drive, and more particularly, to a disc clamping apparatus clamping recording/reproducing media having various thicknesses.

2. Description of the Related Art

In general, a disc drive, which records information on a disc and reproduces the information from the disc, includes a disc clamping apparatus clamping the disc so that the disc securely rotates.

FIG. 1 is an exploded perspective view of a conventional disc drive, and FIG. 2 is a cross-sectional view of the conventional disc clamping apparatus of FIG. 1.

As shown in FIG. 1, a disc drive 1 includes a disc cartridge 10, a tray 20, a deck 30, a disc clamping apparatus 40, and a cover 50. The disc cartridge 10 has upper and lower cases 11 and 12, which form an inner space containing a disc D. A turntable 31 supporting the disc D and a pickup device 32 detecting information recorded on the disc D are installed in the deck 30. The disc clamping apparatus 40, as shown in FIG. 2, includes a clamper 41, a clamper plate 47, a clamper holder 42, a magnet 44, and a plate 33. The clamper 41 clamps the disc D, which is placed on the turntable 31. The clamper plate 47 supports the clamper 41 so that the clamper 41 is moveable. The clamper holder 42 is combined with the clamper 41. The magnet 44 is installed between the clamper 41 and the clamper holder 42. The plate 33 is mounted on in the turntable 31, and a magnetic attractive force operates between the plate 33 and the magnet 44. A magnet back yoke 45 condenses a magnet flux that occurs from the magnet 44.

In the conventional disc drive having the above-described structure, a process of clamping the disc D using the disc clamping apparatus 40 will be described with reference to FIGS. 1 and 2.

When the disc cartridge 10 containing the disc D is loaded on the tray 20 and inserted into the deck 30, a protrusion 21 formed on one side of the tray 20 pushes up an intervening portion 47a of the clamper plate 47 to rotate the disc clamping apparatus 40 in a direction to clamp the disc D. Also, in response to the insertion of the tray 20 into the deck 30, the turntable 31 is raised upward, and the disc D is in a secure placement state on the turntable 31. The clamper 41 moves in a clamping direction toward the turntable 31 due to the magnetic attractive force between the magnet 44 and the plate 33 to clamp the disc D and the turntable 31 together. Thus, the disc D is prevented from moving or separating from the turntable 31 due to a clamping force of the clamper 41. The clamper 41 rotates together with the disc D according to a rotation of the turntable 31 while the disc D is clamped to the clamper 41.

When the tray 20 comes out of the deck 30, the turntable 31 moves in an opposite direction of the clamper 41. Thus, the clamper 41 is separated from the disc D.

As described above, the conventional disc clamping apparatus only clamps a disc having a certain thickness. Thus, if the disc clamping apparatus clamps a thinner or thicker disc than a particular disc having the certain thickness, the disc is not precisely clamped nor securely clamped, and this results in an insecure rotation of the disc.

Discs that are recording/reproducing media become smaller and thinner in accordance with a current development trend of the discs using a high-density recording technique. Also, to meet consumers' demands for slimming disc drives, the thickness of the discs will be thinner.

However, the conventional disc clamping apparatus can clamp only the disc having the certain thickness, but can not clamp discs having various other thicknesses. Thus, a new disc clamping apparatus clamping discs having different thicknesses is needed.

SUMMARY OF THE INVENTION

To solve the above and other problems, it is an object of the present invention to provide a disc clamping apparatus that is capable of securely clamping discs having various thicknesses.

Additional objects and advantages of the invention will be set forth in part in the description which follows and, in part, will be obvious from the description, or may be learned by practice of the invention.

Accordingly, to achieve the above and other objects, there is provided a disc clamping apparatus. The disc clamping apparatus includes an upper clamper holder, a lower clamper holder, a clamper, a first magnetic member, a second magnetic member, and an elastic member. The lower clamper holder is combined with the upper clamper holder. The clamper is movably installed between the upper clamper holder and the lower clamper holder and clamps a disc that is placed on a turntable. The first magnetic member is installed between the upper clamper holder and the lower clamper holder. The second magnetic member is installed on the turntable and faces the first magnetic member so that a magnetic force operates between the first magnetic member and the second magnetic member. The elastic member is disposed between the upper clamper holder and the clamper to provide elasticity (an elastic force) to the clamper so as to clamp a disc.

Here, it is possible that the magnetic force between the first and second magnetic members is greater than the elastic force of the elastic member that is applied to the clamper.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
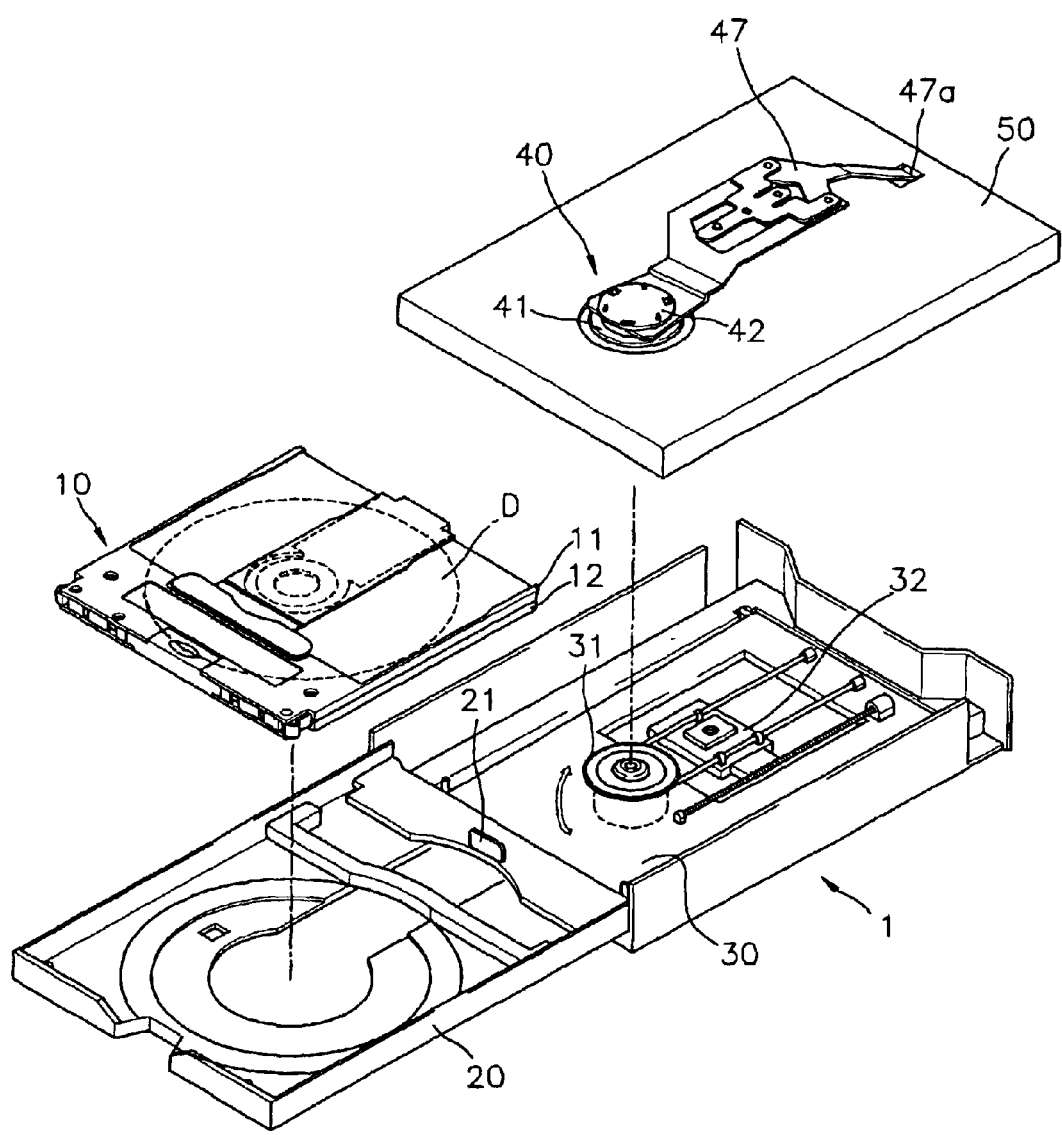
FIG. 1 is an exploded perspective view of a conventional disc drive.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Hereinafter, an embodiment of a disc clamping apparatus according to the present invention will be described with reference to the attached drawings.

Figure 3:
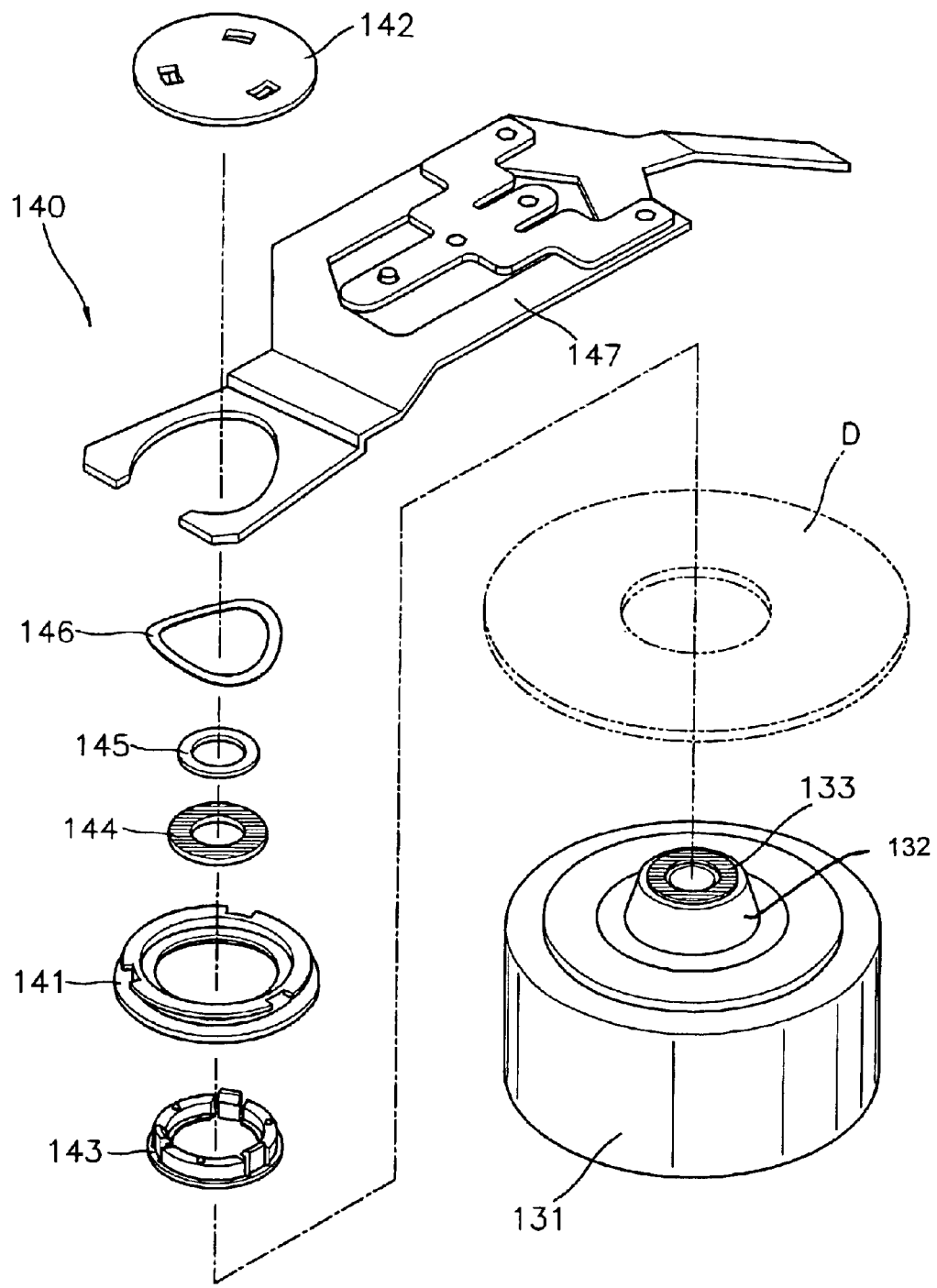
FIG. 3 is an exploded perspective view of a disc clamping apparatus according to an embodiment of the present invention.
Figure 4:
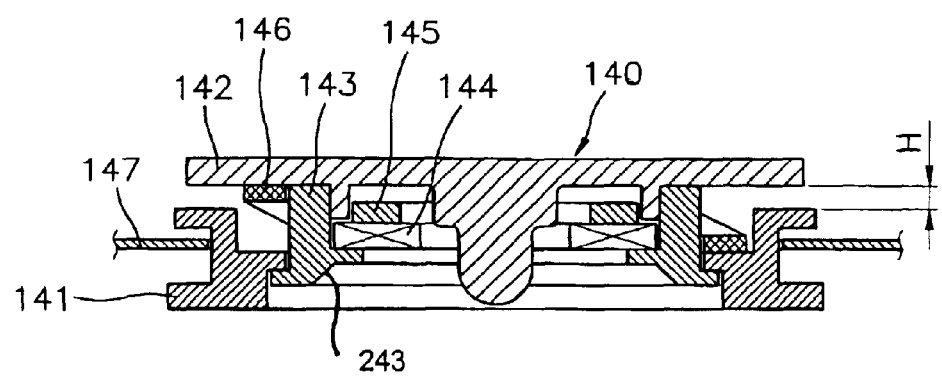
FIG. 4 is a cross-sectional view of the disc clamping apparatus shown in FIG. 3.
Figure 4:
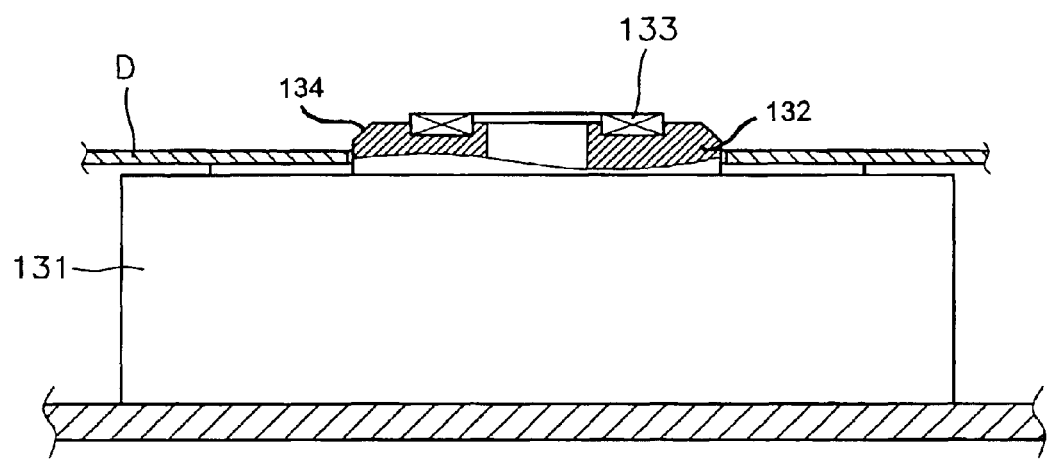

FIG. 3 is an exploded perspective view of a disc clamping apparatus according to an embodiment of the present invention. FIG. 4 is a cross-sectional view of the disc clamping apparatus shown in FIG. 3. Referring to FIGS. 3 and 4, a disc clamping apparatus 140 includes a clamper 141, which clamps a disc D placed on a turntable 131 and is movably supported by a clamper plate 147. The clamper 141 is installed between an upper clamper holder 142 and a lower clamper holder 143 so as to be moveable relative to the upper clamper holder 142 due to the compression or extension of an elastic member 146 that will be described later.

A first magnetic member 144 is installed between the upper and lower clamper holders 142 and 143, and a second magnetic member 133 is installed on a boss 132 of the turntable 131 so as to face the first magnetic member 144. The boss 132 has an oblique side surface 134 corresponding to an oblique holder surface 243 of the lower clamper holder 143. When the boss 132 is introduced into the lower clamper holder 143 through a central opening of the disc D, the oblique side surface 134 is disposed closer to the oblique holder surface 243. Thus, a magnetic attractive force operates between the first and second magnetic members 144 and 133. The elastic member 146 is disposed between the upper clamper holder 142 and the clamper 141 to provide elasticity (an elastic force) to the clamper 141 so as to clamp the disc D. Here, it is possible that one of the first and second magnetic members 144 and 133 is a magnet that generates magnetic flux, and the other one is made of a magnetic substance.

The upper and lower clamper holders 142 and 143 are combined with each other. However, the upper and lower clamper holders 142 and 143 may form a single unit. The elastic member 146 may be flexibly transformed and then provide stability, i.e., elasticity, to the clamper 141 so that the clamper 141 clamps the disc D. The elastic member 146, as shown in FIGS. 3 and 4, may be a wave plate spring as well as a coil spring, rubber, or the like. A magnet back yoke 145 condenses the magnetic flux.

An operation of the disc clamping apparatus 140 having the above-described structure according to the present invention will be described in detail. For descriptive convenience, in the disc clamping apparatus 140 shown in FIG. 4, a gap H between the upper clamper holder 142 and the clamper 141 is 0.9 mm. Also, a method of clamping the disc D when the disc D has a thickness of 0.9 mm or less and when the disc D has a thickness of 0.9 mm or more will be described. It is possible to control a maximum thickness of the disc D that can be clamped, by changing the gap H between the upper clamper holder 142 and the camper 141.

Figure 5:
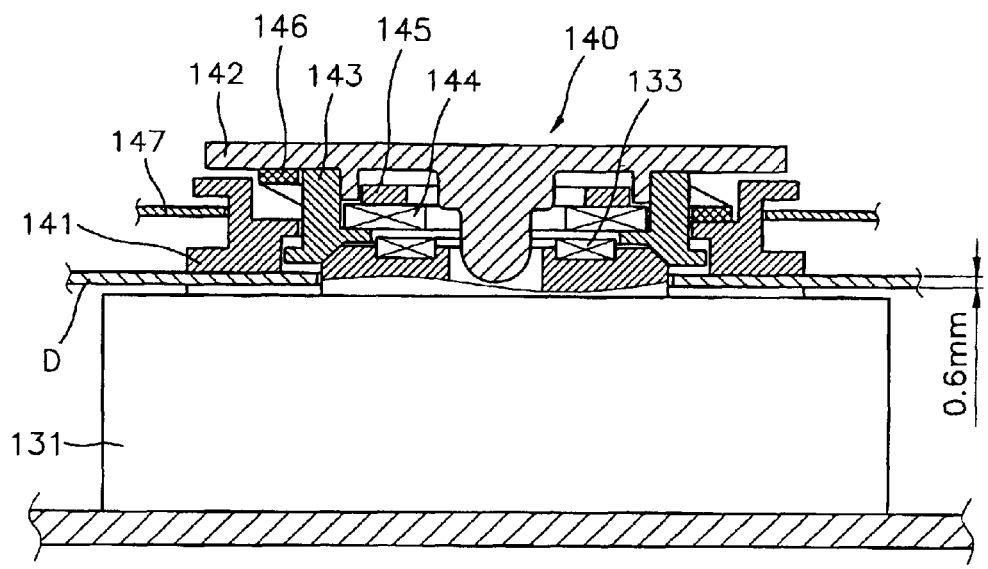
FIG. 5 is a cross-sectional view showing that the disc clamping apparatus shown in FIG. 3 clamps a disc having a thickness of 0.6 mm.
Figure 6:
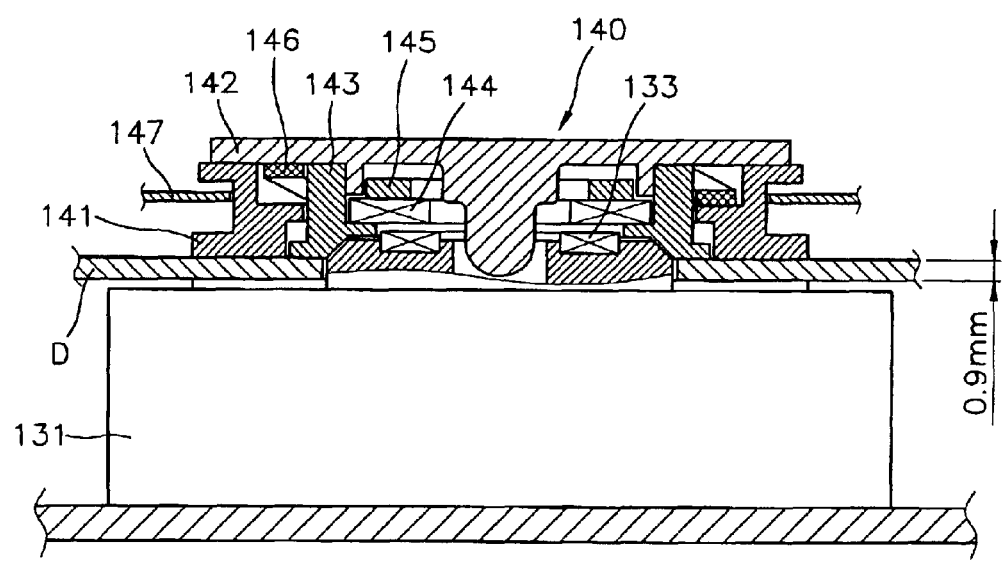
FIG. 6 is a cross-sectional view showing that the disc clamping apparatus shown in FIG. 3 clamps a disc having a thickness of 0.9 mm.
Figure 7:
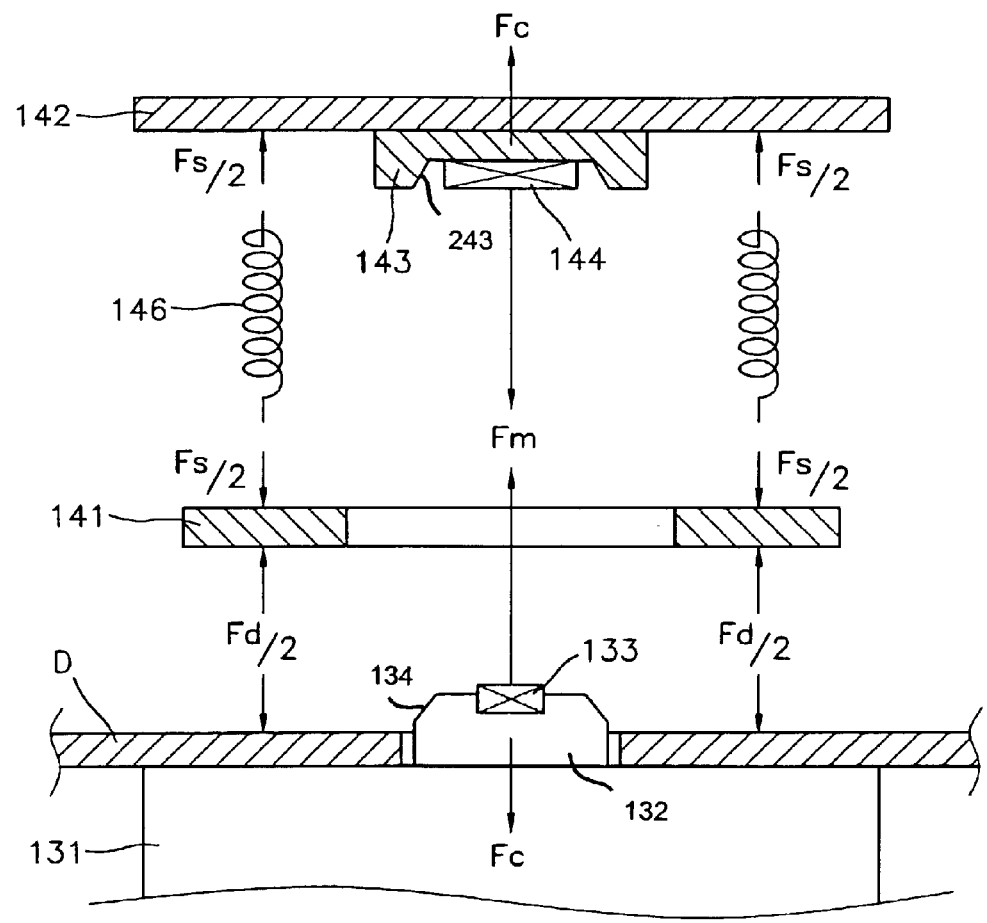
FIG. 7 is a view showing a dynamic relationship between the disc clamping apparatus shown in FIG. 3 and a disc having a thickness of 0.9 mm or less when the disc clamping apparatus clamps the disc.

FIGS. 5 and 6 show that the disc clamping apparatus 140 clamps a disc D having a thickness of 0.9 mm or less. FIG. 5 shows that a disc D having a thickness of 0.6 mm is clamped, and FIG. 6 shows that a disc D having a thickness of 0.9 mm is clamped. FIG. 7 is a view showing a dynamic relationship between the disc clamping apparatus 140 and a disc D having a thickness of 0.9 mm or less when the disc clamping apparatus 140 clamps the disc D.

As shown in FIG. 5, when a disc D having a thickness of 0.6 mm is clamped, the magnetic attractive force between the first and second magnetic members 144 and 133 magnetically couples the lower camper holder 143 to the turntable 131 coupled to a spindle motor 131 (not shown). The camper 141 moves relative to the upper camper holder 142 and is pushed up by a distance of 0.6 mm that is equal to the thickness of the disc D. Thus, the elastic member 146 between the clamper 141 and the upper clamper holder 142 is compressed by 0.6 mm, which is equal to the distance of the relative movement of the clamper 141 with respect to the upper clamper holder 142. Then, the elastic force generated by the stability, i.e., elasticity, of the elastic member 146 that is compressed allows the clamper 141 to closely contact the disc D securely placed on the turntable 131 to clamp the disc D.

As shown in FIG. 6, when a disc D having a thickness of 0.9 mm is clamped, the clamper 141 moves relative to the upper clamper holder 142 and is pushed up by a second distance of 0.9 mm corresponding to the thickness of the disc D. Then, the elastic member 146 between the clamper 141 and the upper camper holder 142 is compressed by 0.9 mm, which is the second distance of the relative movement of the camper 141 with respect to the upper clamper holder 142. Thus, the elastic force generated by the elasticity of the elastic member 146 that is compressed allows the clamper 141 to closely contact the disc D securely placed on the turntable 131 to clamp the disc D. Here, the upper clamper holder 142 contacts the clamper 141, and thus the elastic member 146 is not compressed any more.

When a disc D having a thickness of 0.9 mm is clamped, the magnetic force between the first and second magnetic members 144 and 133 is greater than the elastic force generating by the elasticity of the compressed elastic member 146 so that the magnetic coupling of the lower clamper holder 143 and the turntable 131 is not broken.

A dynamic relationship between the disc D having a thickness of 0.9 mm and the disc clamping apparatus 140 will be described with reference to FIG. 7 and represented by formula 1:

$$Fm > Fd = Fs = K \cdot \Delta S$$

$$Fm = Fs + Fc$$

$$\Delta S = (Sp + Sd) \tag{1},$$

where Fm is the magnetic attractive force between the first and second magnetic members 144 and 133, Fd is a clamping force of the camper 141 that clamps the disc D, Fs is the elastic force generated by the elasticity of the elastic member 146 that affects the clamper 141, and Fc is a force that affects a contact surface between the lower clamper holder 143 and the turntable 131 and which is equal to an external force required when the lower clamper holder 143 and the turntable 131 are separated. Sp is an initial compression distance of the elastic member 146, Sd is a compression distance of the elastic member 146 that is compressed by the disc D, ΔS is a total compression distance of the elastic member 146, and K is a spring constant of the elastic member 146.

If the gap H between the upper clamper holder 142 and the camper 141 is 0.9 mm and the thickness of the disc D that is clamped is 0.9 mm or less, in formula 1, the clamping force Fd of the clamper 141 that clamps the disc D is equal to the elastic force Fs of the elastic member 146 that affects the clamper 141 is smaller than the magnetic force Fm between the first and second magnetic members 144 and 133.

Figure 8:
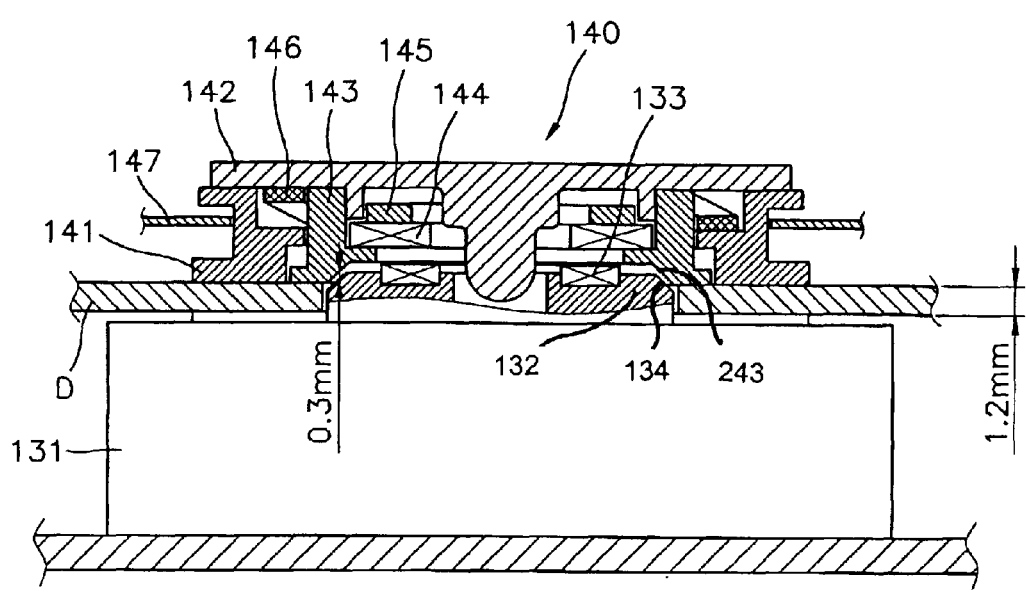
FIG. 8 is a cross-sectional view showing that the disc clamping apparatus shown in FIG. 3 clamps a disc having a thickness of 1.2 mm.
Figure 9:
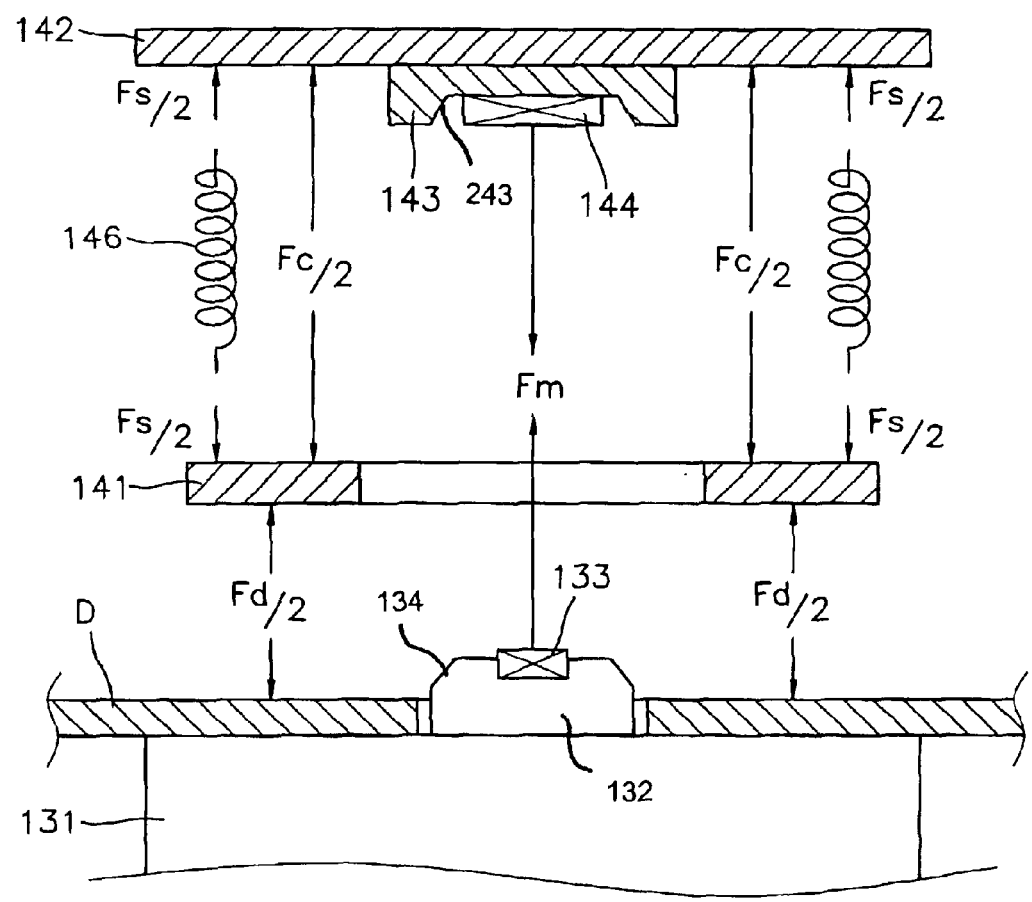
FIG. 9 is a view showing a dynamic relationship between the disc clamping apparatus shown in FIG. 3 and a disc having a thickness of 0.9 mm or more when the disc clamping apparatus clamps the disc.

FIG. 8 is a cross-sectional view showing that the disc clamping apparatus 140 clamps the disc D having a thickness of 0.9 mm or more, i.e., a thickness of 1.2 mm. FIG. 9 is a view showing a dynamic relationship between the disc clamping apparatus 140 and the disc D having a thickness of 0.9 mm or more when the disc clamping apparatus 140 clamps the disc D.

As shown in FIG. 8, the clamper 141 directly contacts the upper clamper holder 142, and thus the elastic member 146 is compressed only by 0.9 mm. Thus, the lower clamper holder 143 that contacts the upper clamper holder 142 is pushed up by a third distance of 0.3 mm with respect to the turntable 131. The oblique holder surface 243 of the lower clamper holder 143 is spaced-apart from the oblique side surface 134 of the boss 132 of the turntable 131 by the third distance in a direction perpendicular to the disc D. In this state, the magnetic force Fm between the first and second magnetic members 144 and 133 is equilibrated with the clamping force Fd of the disc D. In other words, the clamping force Fd for the disc D is the sum of the elasticity Fs of the elastic member 146 and a force of the upper clamper holder 142 that directly presses the clamper 141 without using the elastic member 146 as a medium. The clamping force Fd is equal to the magnetic force Fm between the first and second magnetic members 144 and 133.

The dynamic relationship between the disc clamping apparatus and the disc D will be described with reference to FIG. 9 and represented by formula 2:

$$Fm=Fd=Fs+Fc=K \cdot \Delta S+Fc$$

$$\Delta S=(Sp+Sd) \qquad (2),$$

where Fc is the force of the upper clamper holder 142 that directly pushes the clamper 141 without using the elastic member 146 as a medium, and is equal to the external force if the magnetic coupling of the upper clamper holder 142 and the turntable 131 is broken.

For a more detailed description of the above-described operation of the disc clamping apparatus 140 of the present invention, an example of a disc clamping apparatus, which can clamp a disc D having a maximum thickness of 1.2 mm, is presented. Here, the disc D may have one of the thicknesses of 0.9, 0.6, and 0.3 mm, which are thinner than the thickness of 1.2 mm. However, since the clamping force of a general disc clamping apparatus that clamps the disc D having the thickness of 1.2 mm D is about 3.5N, the clamping force Fd of the disc clamping apparatus of the present invention that clamps the disc D having the thickness of 1.2 mm has to be about 3.5N. Then, the clamping force that affects the disc D having the thickness of 0.9, 0.6, or 0.3 mm, which are thinner than 1.2 mm, is smaller than 3.5N so that the disc D rotates securely. Also, for the descriptive convenience and as an example, the initial compression length of the elastic member 146 is determined to be 0.3 mm.

If the disc D has a thickness of 1.2 mm, referring to FIG. 9 and formula 2, the clamping force Fd and the magnetic force Fm for the disc D are equal. Thus, the magnetic force Fm is about 3.5N. Also, the magnetic force Fm is the sum of the elastic force Fs of the elastic member 146 and the force Fc of the upper clamper holder 142 that directly pushes the clamper 141 without using the elastic member 146 as a medium. Here, the force Fc of the upper clamper holder 142 that directly pushes the clamper 141 is equal to the external force that is provided from outside of the clamper 141 when the lower clamper holder 143 and the turntable 131 is separated. Thus, for the descriptive convenience and as an example, the minimum force for the easy separation of the magnetic coupling of the lower clamper holder 143 and the turntable 131 is determined to be 0.5N. The elastic force Fs of the elastic member 146 is a difference, i.e., 3.0 N, between the magnetic force Fm and the force Fc of the upper clamper holder 142 that directly pushes the camper 141. Thus, the spring constant K of the elastic member 146 is 2.5 N/mm.

Referring to FIG. 7 and formula 1, if the thickness of the disc D is 0.9 mm, the clamping force Fd of the disc D is 3.0N, if the thickness of the disc D is 0.6, the clamping force Fd of the disc D is 2.25N, and if the thickness of the disc D is 0.3 mm, the clamping force Fd of the disc D is 1.5N.

In general, if the thickness of a disc becomes thicker or the diameter of the disc becomes greater at a predetermined rotation speed, the clamping force of the disc becomes greater. In contrast, if the thickness of the disc becomes thinner or the diameter of the disc becomes smaller, it is possible that the clamping force of the disc becomes smaller and variable.

As shown in FIGS. 3 through 9, in the disc clamping apparatus 140 according to the present invention, the clamping force thereof is properly changed based on the thickness of the disc D. The disc clamping apparatus 140 occupies the same space as the conventional disc clamping apparatus but is capable of clamping discs of various thicknesses.

Figure 2:
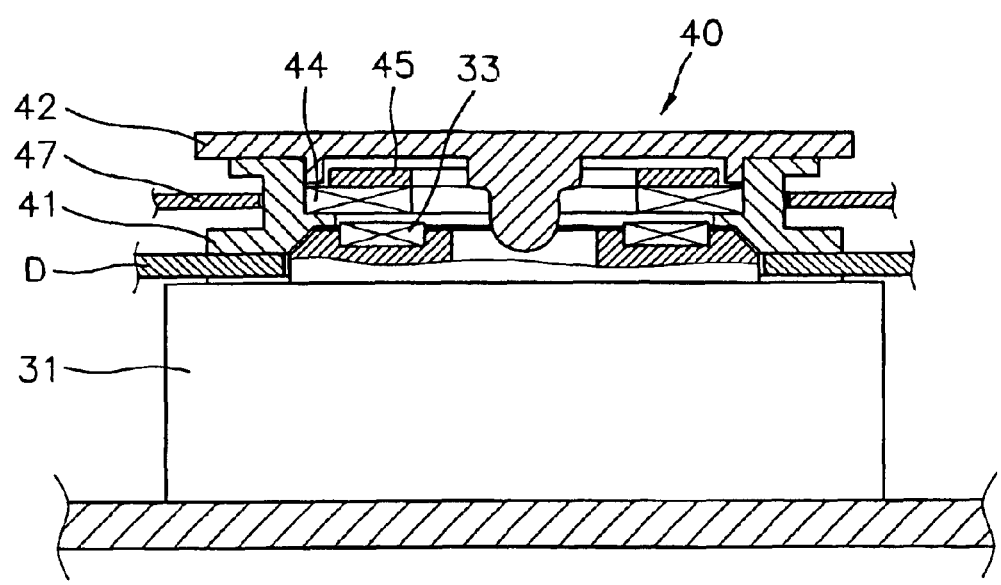
FIG. 2 is a cross-sectional view of a disc clamping apparatus shown in FIG. 1.

According to the conventional disc clamping apparatus 40 of FIG. 2, a predetermined external force must be provided to break the magnetic coupling of the clamper 41 of FIG. 2 and the turntable 31 of FIG. 2. However, according to the disc clamping apparatus 140 of the present invention, the external force Fc for the separation of the lower clamper holder 143 and the turntable 131 is decreased with an increase in the thickness of the disc D that is clamped by the disc clamping apparatus 140. Thus, according to the disc clamping apparatus 140, the lower clamper holder 143 and the turntable 131 can be more smoothly separated.

As described above, according to a disc clamping apparatus of the present invention, it is possible to clamp discs having various thicknesses. Thus, it is possible to flexibly cope with discs having different thicknesses. Also, a clamping force of the disc is changed in proportion to the thickness of the disc, thus a proper clamping force can be applied to the disc based on the thickness of the disc.

Although a few preferred embodiments of the present invention have been shown and described, it would be appreciated by those skilled in the art that changes may be made in this embodiment without departing from the principles and spirit of the invention the scope of which is defined in the claims and their equivalents.

What is claimed is:

1. A disc clamping apparatus for clamping a disc disposed on a turntable, comprising:
   an upper clamper holder;
   a lower clamper holder which is combined with the upper clamper holder;
   a clamper which is movably installed between portions of the upper clamper holder and the lower clamper holder and clamps the disc;
   a first magnetic member which is installed between the upper clamper holder and the lower clamper holder;
   a second magnetic member installed on the turntable to face the first magnetic member to generate a magnetic force to clamp the disc between the clamper and the turntable; and
   an elastic member disposed between the upper clamper holder and the clamper to provide an elastic force to push the clamper against the disc when the disc is clamped.

2. The disc clamping apparatus of claim 1, wherein the elastic member is one of a wave plate spring, a coil spring, and a rubber.

3. The disc clamping apparatus of claim 1, wherein one of the first and second magnetic members is a magnet generating a magnetic flux, and the other one is a magnetic substance.

4. The disc clamping apparatus of claim 1, wherein the magnetic force between the first and second magnetic members is greater than the elastic force of the elastic member.

5. The disc clamping apparatus of claim 1, wherein the upper and lower clamper holders is formed as a single unit.

6. A disc clamp apparatus having a turntable, a first magnetic member mounted on the turntable, a clamp unit having a first clamper holder and a second clamper holder coupled to the first clamper holder to face the turntable, and a second magnetic member disposed in the clamp unit to generate a magnetic force with the first magnetic member to pull the clamp unit toward the turntable to clamp a disc disposed between the turntable and the clamp unit, comprising:
   a clamper movably mounted between the first clamper holder and the second clamper holder to clamp the disc; and
   an elastic member disposed between the clamper and the first clamper holder to generate an elastic force to move the clamper away from the first clamper holder and to push the clamper against the disc when the disc is clamped by the magnetic force.

7. The disc clamp apparatus of claim 6, wherein the disc has one of a first thickness and a second thickness, and the elastic member moves the clamp to be spaced-apart from the first clamper holder by the same distance as the second thickness of the disc when the disc is not clamped.

8. The disc clamp apparatus of claim 6, wherein the disc has one of a first thickness and a second thickness, and the clamp is deformed to control the clamper to be spaced-apart from the first clamper holder by a difference between the first thickness and the second thickness when the disc having the first thickness is clamped.

9. The disc clamp apparatus of claim 6, wherein the disc has one of a first thickness and a second thickness, and the clamp is deformed to control the clamper to be in contact with the first clamper holder when the disc having the second thickness is clamped.

10. The disc clamp apparatus of claim 6, wherein the disc has one of a first thickness of 9 mm and a second thickness of 6 mm.

11. The disc clamp apparatus of claim 6, wherein the disc has one of a first thickness and a second thickness, and the first thickness is less than the second thickness.

12. The disc clamp apparatus of claim 6, wherein the disc has one of a first thickness and a second thickness, and the first thickness is less than 9 mm.

13. The disc clamp apparatus of claim 6, wherein the disc has one of a first thickness and a second thickness, and the second thickness is equal to or greater than 9 mm.

14. The disc clamp apparatus of claim 6, wherein the disc has one of a first thickness and a second thickness, and the second thickness is about 12 mm while the first thickness is less than the second thickness.

15. The disc clamp apparatus of claim 6, wherein the clamp unit comprises a magnetic yoke condensing a magnetic flux generated by the first and second magnetic members to generate the magnetic force.

16. The disc clamp apparatus of claim 6, wherein the magnetic force is greater than the elastic force and a clamp force of the clamp unit to clamp the disc.

17. The disc clamp apparatus of claim 6, wherein the magnetic force is equal to a sum of the elastic force and an external force generated between contact surfaces of the second clamper holder and the turntable.

18. The disc clamp apparatus of claim 17, wherein the external force is generated when the second clamper holder is separated from the turntable.

19. The disc clamp apparatus of claim 6, wherein the elastic member is deformed by a sum of an initial compression distance and a thickness of the disc.

20. The disc clamp apparatus of claim 6, wherein the elastic force is opposite to the magnetic force.

21. The disc clamp apparatus of claim 6, wherein the disc has one of a first thickness and a second thickness, and the first thickness and the second thickness are different from each other and one of 0.6 mm, 0.9 mm, and 1.2 mm.

22. The disc clamp apparatus of claim 6, wherein the first clamper holder and the second clamper holder is integrated in a single body.

23. The disc clamp apparatus of claim 6, wherein the turntable comprises a boss and an oblique side surface formed on the boss, and the second clamper holder comprises an oblique holder surface corresponding to the oblique side surface of the turntable.

24. The disc clamp apparatus of claim 23, wherein the disc has one of a first thickness and a second thickness being greater than the first thickness, and the oblique holder surface of the second clamper holder is in contact with the oblique side surface of the turntable when the clamper clamps the disc having the first thickness.

25. The disc clamp apparatus of claim 23, wherein the disc has one of a first thickness and a second thickness, and the oblique holder surface of the second clamper holder is not in contact with the oblique side surface of the turntable when the clamper clamps the disc having the second thickness.

26. The disc clamp apparatus of claim 23, wherein the disc has one of a first thickness and a second thickness, and the elastic member is deformed to control the clamper to be spaced-apart from the first clamper holder by a distance less than a difference between the first thickness and the second thickness.

27. The disc clamp apparatus of claim 23, wherein the disc has one of a first thickness and a second thickness, and the elastic member is deformed to control the clamper to be contact with the first clamper holder when the disc having the second thickness is clamped.

28. The disc clamp apparatus of claim 23, wherein the disc has one of a first thickness and a second thickness, and the clamper is in contact with the first clamper holder while the oblique holder surface of the second clamper holder is not in contact with the oblique side surface of the turntable when the disc having the second thickness is clamped.

29. The disc clamp apparatus of claim 23, wherein the disc has one of a first thickness and a second thickness, and the clamper is in contact with the disc while the oblique holder surface of the second clamper holder is not in contact with the oblique side surface of the turntable when the disc having the second thickness is clamped.

30. The disc clamp apparatus of claim 23, wherein the disc has one of a first thickness and a second thickness, and the oblique holder surface of the second clamper holder is spaced-apart from the oblique side surface of the turntable by a difference between the first thickness and the second thickness when the disc having the second thickness is clamped.

31. The disc clamp apparatus of claim 30, wherein the elastic member is compressed by the same distance as the first thickness when the disc having one of the first thickness and the second thickness is clamped.

32. The disc clamp apparatus of claim 23, wherein the disc has one of a first thickness and a second thickness, and the magnetic force is equal to a clamp force of the clamp unit to clamp the disc.

33. The disc clamp apparatus of claim 23, wherein the disc has one of a first thickness and a second thickness, and the magnetic force is equal to a sum of the elastic force and an external force generated from the first clamper holder toward the turntable.

34. The disc clamp apparatus of claim 33, wherein the external force is a force generated when the second clamper holder is separated from the turntable.

35. The disc clamp apparatus of claim 23, wherein the disc has one of a first thickness and a second thickness, and the elastic member is initially compressed by a difference between the first thickness and the second thickness.

36. The disc clamp apparatus of claim 35, wherein the difference is about 3 mm.

37. A disc clamp apparatus having a turntable, a first magnetic member mounted on the turntable, a clamp unit having a first clamper holder and a second clamper holder coupled to the first clamper holder, and a second magnetic member disposed in the clamp unit to generate a magnetic force with the first magnetic member to pull the clamp unit toward the turntable to clamp a disc disposed between the turntable and the clamp unit, comprising:

a clamper movably mounted between the first clamper holder and the second clamper holder to clamp the disc having one of a first thickness and a second thickness greater than the first thickness; and an elastic member disposed between the clamper and the first clamper holder to generate an elastic force to move the clamper away from the first clamper holder and to push the clamper against the disc when the disc is clamped by the magnetic force, being deformed by a first distance when the disc having the first thickness is clamped, and being deformed by a second distance when the disc having the second thickness is clamped.

38. The disc clamp apparatus of claim 37, wherein the elastic member is deformed by an initial amount to push the clamper against the turntable when the disc is not clamped.

39. The disc clamp apparatus of claim 38, wherein the initial amount is a difference between the first thickness and the second thickness.

40. A disc clamp apparatus having a turntable, a first magnetic member mounted on the turntable, a clamp unit having a first clamper holder and a second clamper holder coupled to the first clamper holder, and a second magnetic member disposed in the clamp unit to generate a magnetic force with the first magnetic member to pull the clamp unit toward the turntable to clamp a disc disposed between the turntable and the clamp unit, comprising:

a clamper movably mounted between the first clamper holder and the second clamper holder to clamp the disc having one of a first thickness and a second thickness;

an elastic member disposed between the clamper and the first clamper holder to generate an elastic force to move the clamper away from the first clamper holder and to push the clamper against the disc when the disc is clamped by the magnetic force;

a turntable surface formed on the turntable; and a holder surface formed on the second clamper holder to face the turntable surface, being in contact with the turntable surface when the disc having the first thickness is clamped by the magnetic force, and being separated from the turntable surface when the disc having the second thickness is clamped by the magnetic force.

41. The disc clamp apparatus of claim 40, wherein the clamper contacts the disc regardless of a contact between the turntable surface and the holder surface by the elastic force when the disc is clamped by the magnetic force.

* * * * *